Figures 1, 2:
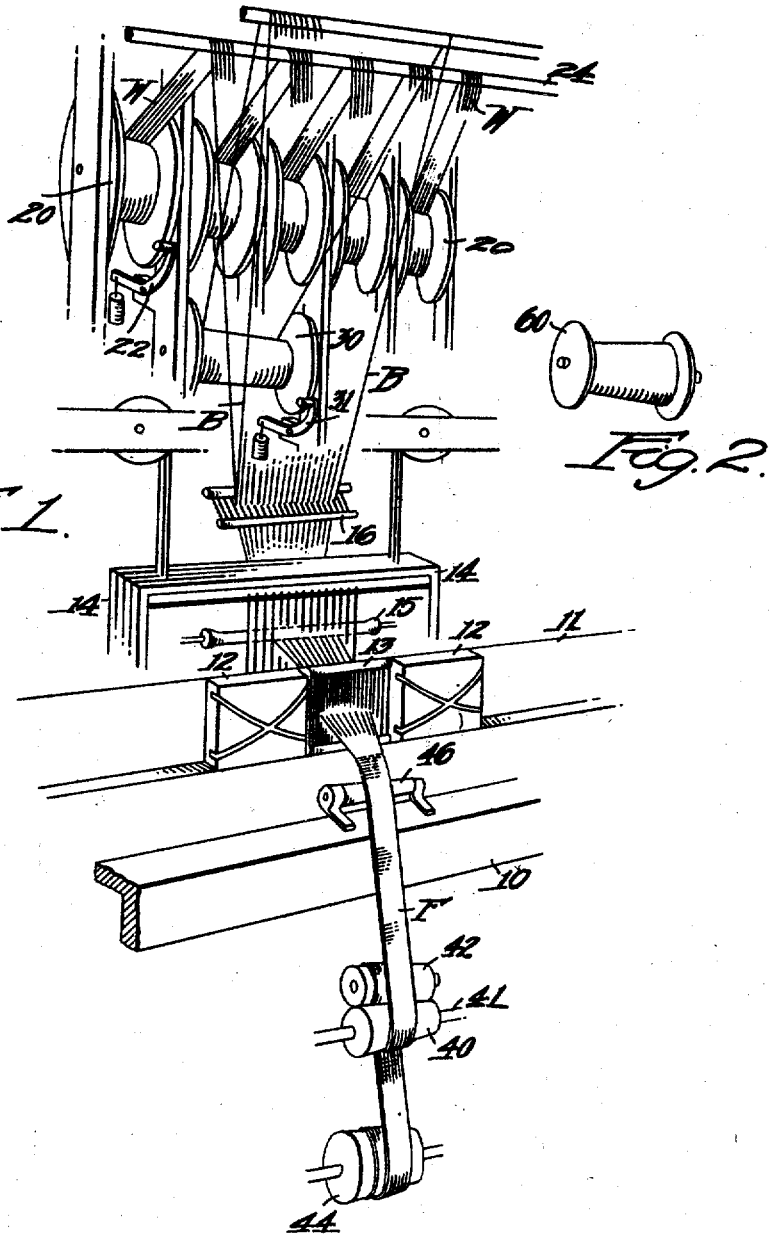

J. V. MOORE

METHOD OF PRODUCING ELASTIC FABRIC

Jan. 20, 1931.

Original Filed March 1, 1929

Re. 17,935

INVENTOR.

John V. Moore

BY

Smith Fay & Hawley

ATTORNEYS.

Witness
C. F. Wesson.

Reissued Jan. 20, 1931

Re. 17,935

UNITED STATES PATENT OFFICE

JOHN V. MOORE, OF PAWTUCKET, RHODE ISLAND, ASSIGNOR TO MOORE FABRIC COMPANY, OF PAWTUCKET, RHODE ISLAND, A CORPORATION OF RHODE ISLAND

METHOD OF PRODUCING ELASTIC FABRIC

Original application filed March 1, 1929, Serial No. 343,662. Divided and application filed June 21, 1930, Serial No. 462,845. Original No. 1,772,958, dated August 12, 1930. Application for reissue filed November 29, 1930. Serial No. 499,116.

This is a division of my application, Serial No. 343,662, filed by me March 1, 1929.

This invention relates to the production of curvilinear elastic fabric and more particularly to a method of producing relatively narrow elastic fabric, adapted for use in sanitary belts, garters and other similar articles.

It is the object of my invention to provide an improved method and procedure for producing such curvilinear elastic fabric.

My invention further relates to arrangements of operations which will be hereinafter described and more particularly pointed out in the appended claims.

A form of mechanism by the use of which my invention may be practiced is shown in the drawings, in which Fig. 1 is a perspective view of portions of a narrow fabric loom, and Fig. 2 is a perspective view of a modified warp beam.

Referring to the drawings, I have shown portions of a narrow fabric loom including a breast beam 10, a lay 11 having guiding blocks 12 in which the usual shuttles are reciprocated, a reed 13, a plurality of harnesses 14, a warp guide-roll 15 at the rear of the harnesses, and an assembly reed 16, preferably mounted above the guide-roll 15. The reed 13 is preferably graduated with the dents more closely together toward the left hand end of the reed, as viewed in the drawing.

Groups of elastic warp threads W are wound on sectional warp beams 20, mounted for independent rotation and separately tensioned by friction devices 22, of which one only is shown. It will be understood, however, that one such device is provided for each warp beam 20.

The warps W pass from the beams 20 over an elevated guide-bar 24 and thence to the assembly reed 16. Binder warps B are wound on a single cylindrical warp beam 30 mounted for separate rotation and separately tensioned by a friction device 31.

The woven fabric F passes over the breast beam 10 to a conical take-up roll 40, mounted on a shaft 41 and positively driven. A guide-roll 42 increases the lap of the fabric F on the take-up roll 40 and the fabric passes from the roll 42 to a conical cloth roll 44. A conical guide roll 46 may be provided on the breast beam 10.

The method of production of curvilinear elastic fabric by use of the mechanism described is as follows:

The woven fabric is drawn downward by the conical take-up roll 40, but the non-elastic binder warp threads B are supplied from the cylindrical warp beam 30. The joint effect is to tension the binder warps increasing towards the large end of the take-up roll 40, leaving the binder warps toward the smaller end relatively slack.

The elastic warp threads W are preferably woven under relatively heavy but substantially uniform tension, which tension is maintained substantially uniform during the weaving, as the warp beams are mounted to rotate independently and will let off a greater length of warp toward the side of the fabric corresponding to the larger end of the take-up roll 40.

The more tightly the binder warps are tensioned, the more firmly they bind the elastic warps. The more tightly the elastic warps are bound into the fabric, the less they are able to contract when the fabric is released from the tension.

Consequently the edge of the fabric where the binder warps are under greater tension and more tightly woven will be longer upon the release than the edge of the fabric where the binder warps are relatively slack tensioned. The fabric will thus assume a curvilinear shape, with the long edge of the fabric towards the larger end of the take-up roll 40.

The results thus far described could be attained with a reed of uniform spacing, but the curvilinear effect is increased by use of the graduated reed 13, which crowds the warp threads more closely together at the long edge of the fabric, thus increasing the close binding of the elastic warps and still further reducing the relative contraction thereof at the long edge.

If still further curvature is desired, a slightly tapered warp beam 60 (Fig. 2) may be substituted for the straight warp beam 30 shown in Fig. 1. If the larger end of the warp beam 60 is placed at the right, or toward the short edge of the woven fabric, the slackness of the binder warps on the short edge will be accentuated and a sharper curvature will be secured.

Claims to the fabric per se are not made herein, as they form the subject matter of my original application, Ser. No. 343,662. Claims to the mechanism and specific method claims based on the detailed operation thereof are not made herein, as they form the subject matter of a divisional application, Serial No. 438,785 filed by me March 25, 1930.

Having thus described my invention and the advantages thereof, I do not wish to be limited to the details herein disclosed, otherwise than as set forth in the claims, but what I claim is:—

1. The method of weaving curvilinear elastic fabric which consists in supplying elastic warp threads under substantially uniform tension, supplying binder warps, inserting weft, and binding the elastic warps more firmly between said binder warps towards one edge of the fabric, thereby restricting the contraction of said elastic warps.

2. The method of weaving curvilinear elastic fabric which consists in supplying rubber warp threads under substantially uniform tension, supplying non-elastic warp threads, inserting weft threads, each extending across the entire width of the fabric, taking up the woven fabric, and in variably controlling the shrinkage of the rubber warp threads after the weft is inserted, whereby greater shrinkage occurs at one edge of the woven fabric and curvature is effected.

3. The method of weaving curvilinear elastic fabric which consists in supplying rubber warp threads under substantially uniform tension, supplying non-elastic warp threads relatively tight at one selvage and relatively loose at the other selvage at the point of weaving, inserting weft threads and taking up the woven fabric, the non-elastic warp threads variably controlling the shrinkage of the rubber warp threads after the weft is inserted, whereby greater shrinkage occurs at one edge of the fabric and curvature is effected.

4. The method of weaving curvilinear elastic fabric which consists in supplying a plurality of rubber warp threads under substantially the same weaving tension throughout the width of the fabric, supplying binder warps interspersed with said rubber warp threads, inserting weft threads in said fabric each extending across the entire width of the fabric maintaining the rubber warp threads under substantial tension while the weft threads are being inserted and beaten up, and in variably restricting the contraction of the rubber warp threads when the fabric is released from the weaving tension, such restriction of contraction progressively increasing from one edge to the other of the fabric.

In testimony whereof I have hereunto affixed my signature.

JOHN V. MOORE.